(12) United States Patent
Piety et al.

(10) Patent No.: US 7,538,663 B2
(45) Date of Patent: May 26, 2009

(54) ENHANCEMENT OF PERIODIC DATA COLLECTION BY ADDITION OF AUDIO DATA

(75) Inventors: Richard W. Piety, Knoxville, TN (US); James C. Robinson, Knoxville, TN (US); Thomas E. Nelson, Knoxville, TN (US)

(73) Assignee: CSI Technology, Inc., Wilmington, DE (US)

( * ) Notice: Subject to any disclaimer, the term of this patent is extended or adjusted under 35 U.S.C. 154(b) by 320 days.

(21) Appl. No.: 11/627,606

(22) Filed: Jan. 26, 2007

(65) Prior Publication Data

US 2008/0183429 A1 Jul. 31, 2008

(51) Int. Cl.
G08B 23/00 (2006.01)

(52) U.S. Cl. .................. 340/500; 340/679; 702/182

(58) Field of Classification Search ............ 340/500, 340/517, 521, 679, 683; 702/104, 182, 185, 702/189, 190
See application file for complete search history.

(56) References Cited

U.S. PATENT DOCUMENTS

| | | | | |
|---|---|---|---|---|
| 6,525,658 | B2* | 2/2003 | Streetman et al. | 340/522 |
| 6,853,920 | B2* | 2/2005 | Hsiung et al. | 702/1 |
| 6,943,665 | B2* | 9/2005 | Chornenky | 340/5.82 |
| 7,037,268 | B1* | 5/2006 | Sleva et al. | 340/855.6 |
| 7,039,560 | B2 | 5/2006 | Kawatahara et al. | |
| 7,174,277 | B2* | 2/2007 | Vock et al. | 702/188 |
| 7,313,502 | B2* | 12/2007 | Schuster et al. | 702/188 |
| 2002/0057340 | A1* | 5/2002 | Fernandez et al. | 340/988 |
| 2004/0245467 | A1 | 12/2004 | Lannestedt | |
| 2004/0261531 | A1 | 12/2004 | Coutu et al. | |
| 2007/0236346 | A1* | 10/2007 | Helal et al. | 340/539.22 |
| 2008/0106425 | A1* | 5/2008 | Deaver et al. | 340/646 |
| 2008/0162088 | A1* | 7/2008 | DeVaul et al. | 702/189 |
| 2008/0234935 | A1* | 9/2008 | Wolf et al. | 701/216 |

FOREIGN PATENT DOCUMENTS

| | | |
|---|---|---|
| DE | 3332941 | 3/1985 |
| DE | 19822908 | 11/1988 |
| EP | 1850325 | 10/2007 |
| GB | 2064771 | 6/1981 |
| GB | 2104658 | 3/1983 |
| GB | 2163850 | 3/1996 |
| JP | 5187973 | 7/1993 |
| JP | 08261817 | 10/1996 |
| WO | 2005073680 | 8/2005 |

* cited by examiner

Primary Examiner—John A Tweel, Jr.
(74) Attorney, Agent, or Firm—Luedeka, Neely & Graham, P.C.

(57) ABSTRACT

A portable route-based machine data collector stores audio files to supplement associated machine performance data, such as vibration data. The audio files, which may include voice comments, audio segments of raw vibration data, or frequency-shifted components of the vibration data, are stored in the data collector as standard-format digital audio files and are later downloaded to a computer for further analysis. Test personnel can then replay the audio files for data analysis personnel to get second opinions regarding whether machine faults may be indicated by the recorded sounds. Also, audio files associated with normal and abnormal machine operation may be saved on the portable data collector and used as baselines or for training purposes. Verbal operating instructions may also be stored as audio files on the portable data collector for replay by test operators in the field. In a case where the portable data collector is an ultrasonic monitoring unit, frequency-shifted (audible) ultrasonic data may be stored in an audio file in association with non-shifted ultrasonic data.

24 Claims, 2 Drawing Sheets

ENHANCEMENT OF PERIODIC DATA COLLECTION BY ADDITION OF AUDIO DATA

FIELD

This invention relates to the field of industrial machine monitoring and fault analysis. More particularly, this invention relates to a system for acquiring data indicative of operational characteristics of industrial machines.

BACKGROUND

Portable route-based data collectors and analyzers are used to acquire data for indicating the operational status of industrial machines. For example, some data collectors are used to measure vibration of various machines along a measurement route within an industrial facility. Vibration characteristics of the machines are typically stored as digital vibration data that may be analyzed to detect faults in the operation of the machines. The CSI Model 2117A1, manufactured by Emerson Process Management, is an example of one such route-based vibration data collector unit.

Other examples of route-based data collector units include portable ultrasonic units for measuring ultrasonic characteristics of machines, and portable infrared camera units for measuring machine temperature characteristics.

To aid in more fully understanding machine performance data and the circumstances surrounding the acquisition of machine performance data, it would be desirable to record short audio files along with the machine data. For example, it would be helpful in some situations for a data analyst to hear audible sounds generated by a machine as the machine creates a particular vibration characteristic. It would also be desirable for test personnel to be able to record verbal notes regarding a measurement at a particular route point and to store the verbal notes in association with test data collected at the route point. No prior route-based data collector unit has provided this capability.

What is needed, therefore, is the ability to store audio files on a route-based data collector to supplement machine performance data also recorded on the data collector. Also needed is a route-based data collector on which verbal instructions or reminders can be recorded for playback to operators when a measurement at a route point is initiated, on which route notes can be entered verbally rather than textually as measurements are made along a route, and on which an audio library of faults can be stored for playback and comparison when listening for faults in the field.

SUMMARY

The above and other needs are met by a portable route-based machine data collector that stores audio files (also referred to herein as "sound bites" or "audio annotations") to supplement associated machine performance data. The audio files, which may include audio segments of raw vibration data, frequency-shifted vibration data or voice annotations, may be stored in the data collector as standard-format digital audio data files and later downloaded into route-based data files for further analysis. Using the invention, test personnel can replay the audio files for data analysts to get second opinions regarding whether machine faults may be indicated by the recorded sounds. Also, audio files associated with normal and abnormal machine operation may be saved and used as baselines or for training purposes. In some embodiments of the invention, frequency-shifted or time-expanded vibration data or ultrasonic data may be stored as audio data in an audio file in association with the original vibration or ultrasonic data.

According to some preferred embodiments, the invention may be used to record verbal instructions or reminders that are played back to test operators when a route point is activated on a route-based portable data collection unit. In some embodiments, the invention provides for entering route notes verbally rather than using text input. In some embodiments, the invention provides for storing an audio library of faults on a data collector for playback and comparison when listening for faults in the field. The data collector unit of some preferred embodiments communicates wirelessly with a headset/microphone for recording audio notes and listening to baseline audio data in the field.

In some preferred embodiments, the invention provides a portable apparatus for acquiring information indicative of the operational status of machines distributed at various locations along a measurement route. The apparatus comprises one or more sensors for measuring characteristics of a machine at a location on the measurement route. Based on the sensed characteristics, the one or more sensors generate one or more analog sensor signals that include one or more frequency components that may be beyond a human-audible frequency range. The apparatus includes a sound sensor for generating an analog audio signal associated with the characteristics of the machine measured by the one or more sensors. Preferably, the analog audio signal is generated at one or more frequencies that are within the human-audible frequency range. The apparatus includes one or more analog-to-digital conversion circuits for converting the one or more analog sensor signals and the analog audio signal to digital sensor data and digital audio data, respectively. A digital storage device in the apparatus stores the digital sensor data and the associated digital audio data.

In one preferred embodiment, the invention provides a portable apparatus for acquiring information indicative of the operational status of a machine in an industrial environment. The portable apparatus includes a measurement sensor for measuring a characteristic of the machine and generating an analog sensor signal based thereon, where the analog sensor signal includes inaudible frequency components that are beyond a human-audible frequency range. The apparatus includes an analog-to-digital conversion circuit for converting the analog sensor signal to digital sensor data. A processor receives and processes the digital sensor data to shift the inaudible frequency components into the human-audible frequency range. This frequency-shifting process generates digital audio data that includes at least the frequency-shifted components. The apparatus also includes a digital storage device for storing the digital audio data in association with the digital sensor data.

In another aspect, the invention provides a method for acquiring information using a portable route-based measurement apparatus, where the acquired information is indicative of the operational status of machines distributed at various locations along a measurement route. The method includes steps of (a) sensing a characteristic of a machine at a location on the measurement route, (b) generating a sensor signal based on the sensed characteristic where the sensor signal includes one or more frequencies that may be beyond a human-audible frequency range, (c) generating an audio signal associated with the sensed characteristic of the machine where the audio signal includes one or more frequencies that are within the human-audible frequency range, (d) storing the sensor signal on the portable route-based measurement apparatus as digital sensor data that is associated with the location along the measurement route, and (e) storing the audio signal on the portable route-based measurement apparatus as digital audio data that is associated with the location along the measurement route.

In yet another aspect, the invention provides a method for storing information indicative of the operational status of one or more machines using a portable machine data measurement apparatus. The method includes steps of (a) storing digital audio data files containing audio data that is representative of audio sounds produced by machines experiencing various fault conditions, (b) displaying a list of fault conditions on the portable apparatus, (c) receiving first selection input from an input device associated with the portable apparatus, where the first selection input indicates a selection of a fault condition from the list, (d) accessing a digital audio files associated with the selected fault condition, (e) generating sound based on the accessed digital audio file, where the sound is representative of a sound produced by a machine experiencing a particular fault condition, (f) receiving second selection input from the input device, where the second selection input indicates a selection of a test setup file for setting up the portable apparatus to collect data for diagnosing the particular fault condition, (g) sensing characteristics of the machine using the portable apparatus set up according to the selected test setup file, (h) generating sensor signals based on the sensed characteristics, and (i) storing the sensor signals on the portable apparatus as digital sensor data.

BRIEF DESCRIPTION OF THE DRAWINGS

Further advantages of the invention are apparent by reference to the detailed description in conjunction with the figures, wherein elements are not to scale so as to more clearly show the details, wherein like reference numbers indicate like elements throughout the several views, and wherein.

DETAILED DESCRIPTION

Figure 1:
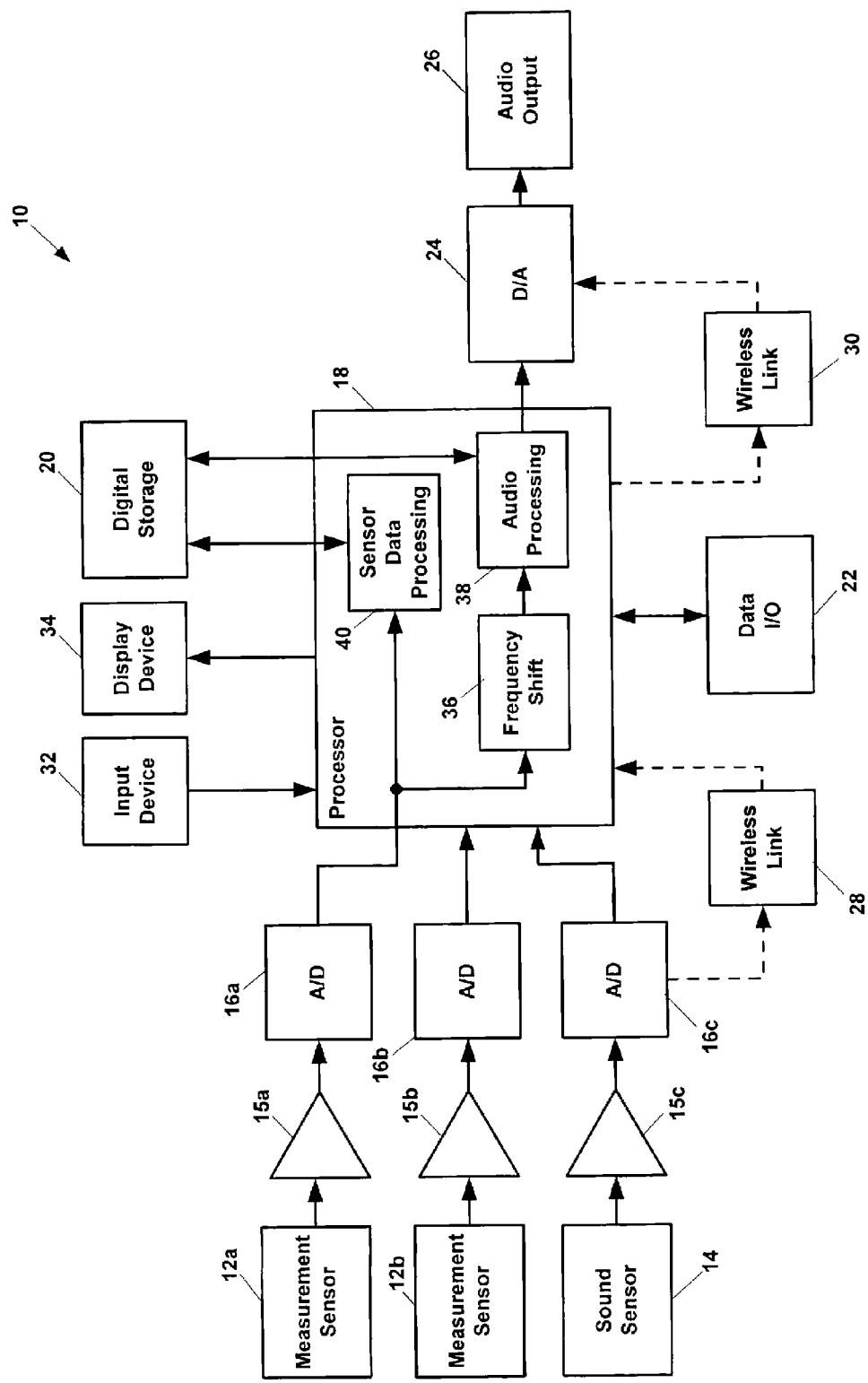
FIG. 1 depicts a functional block diagram of a portable machine data collection unit according to a preferred embodiment of the invention.

FIG. 1 generally depicts a portable machine data collection apparatus 10 according to a preferred embodiment of the invention. In various embodiments described herein, the apparatus 10 is used in measuring machine performance characteristics of one or more machines in an industrial setting. Examples of machine performance characteristics include vibration, ultrasonic emissions, revolutions-per-minute (RPM) and infrared emissions. In a preferred embodiment, the apparatus 10 is used in making measurements on multiple machines distributed along a "measurement route" within an industrial facility. In this embodiment, the apparatus 10 may store measurement setup information, measurement instructions and measured data for each measurement point along the route.

Figure 2:
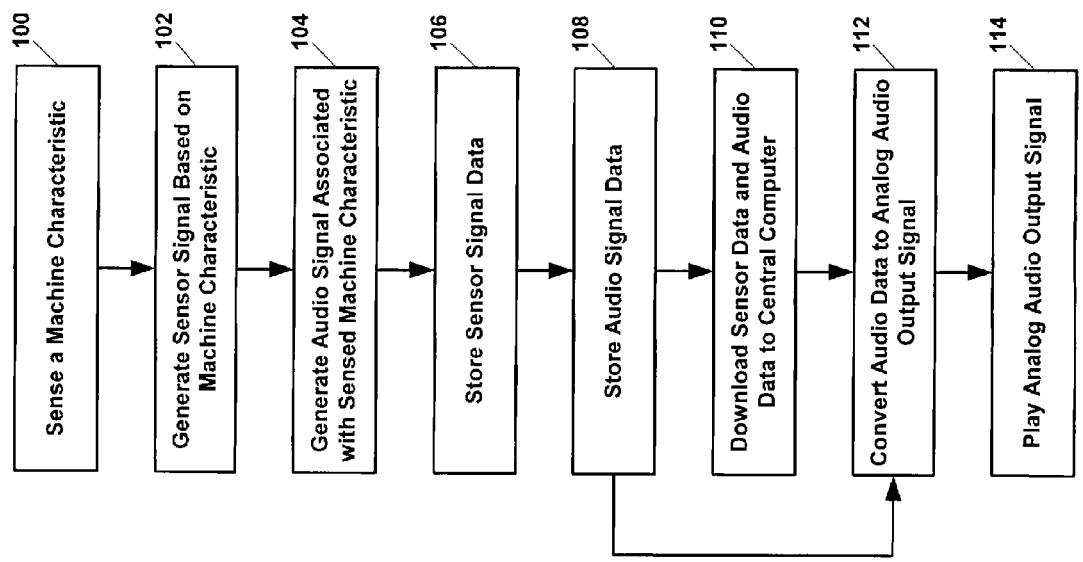
FIG. 2 depicts a method for recording sensor data and associated audio data on a portable machine data collection unit according to a preferred embodiment of the invention.

The following description of the operation of the apparatus 10 also makes reference to FIG. 2 which depicts steps in a method for collecting and storing sensor data and associated audio data.

As shown in FIG. 1, the apparatus 10 includes a measurement sensor 12a for sensing one or more characteristics of an industrial machine while the machine is operating (step 100 in FIG. 2). In an exemplary embodiment, the sensor 12a is an accelerometer or velocimeter for measuring vibration characteristics of the industrial machine. In another embodiment, the sensor 12a is an ultrasonic sensor for detecting ultrasonic emissions from machines. In each embodiment, the sensor 12a generates a sensor signal that is indicative of one or more operational characteristics of a machine-under-test (step 102 in FIG. 2), which characteristics may include vibration, ultrasonic emissions or other characteristics. For example, in an embodiment wherein the sensor 12a is an accelerometer, the sensor signal is a vibration signal. In an embodiment wherein the sensor 12a is an ultrasonic sensor, the sensor signal is an ultrasonic emission signal.

The analog sensor signal generated by the sensor 12a is provided to signal conditioning circuitry 15a. The signal conditioning circuitry 15a preferably includes signal filter, offset and gain stages as are well known to those skilled in the art. The conditioned analog sensor signal at the output of the signal conditioning circuitry 15a is provided to an analog-to-digital conversion circuit (ADC) 16a which converts the analog sensor signal to digital sensor data. Those skilled in the art will appreciate that the sensor 12a, signal conditioning circuitry 15a and ADC 16a may be contained within a common sensor housing. Alternatively, the ADC 16a and conditioning circuitry 15a may be contained within a housing that is separate from that of the sensor 12a.

The apparatus 10 also preferably includes a measurement sensor 12b for sensing characteristics of an industrial machine that are generally not vibration-related, such as infrared emissions (temperature) or RPM. In an exemplary embodiment, the sensor 12b is an infrared sensor for capturing infrared images of the industrial machine. In another embodiment, the sensor 12b is a tachometer for measuring RPM. In each embodiment, the sensor 12b generates a sensor signal that is indicative of the sensed operational characteristic of a machine-under-test. For example, in an embodiment wherein the sensor 12b is an infrared sensor, the sensor signal is a thermal signature signal. In an embodiment wherein the sensor 12b is a tachometer, the sensor signal is an RPM signal.

The analog sensor signal generated by the sensor 12b is provided to signal conditioning circuitry 15b. The signal conditioning circuitry 15b preferably includes signal filter, offset and gain stages as are well known to those skilled in the art. The conditioned analog sensor signal at the output of the signal conditioning circuitry 15b is provided to an analog-to-digital conversion circuit (ADC) 16b which converts the analog sensor signal to digital sensor data. Those skilled in the art will appreciate that the sensor 12b, signal conditioning circuitry 15b and ADC 16b may be contained within a common sensor housing. Alternatively, the ADC 16b and conditioning circuitry 15b may be contained within a housing that is separate from that of the sensor 12b.

The digital sensor data at the output of the ADCs 16a and 16b is provided to a processor 18. In preferred embodiments, the processor 18 includes one or more sensor data processing modules 40 for performing analysis routines on the sensor data. For example, in embodiments of the invention wherein the sensor data is time-based vibration data, the data processing module 40 may perform a Fast Fourier Transform (FFT) of the time-based vibration data to generate a frequency spectrum of the vibration data. Other functions provided by the processor 18 include calibration and measurement setup functions, display control functions, and data transfer and storage functions.

As shown in FIG. 1, the processor 18 includes a frequency-shift module 36 for shifting the frequency of components of the sensor signal detected by the measurement sensor 12a. For example, if the sensor 12a is an accelerometer, it will generally produce sensor signals having some frequency components that are above human hearing range. The frequency-shift module 36 digitally alters the sensor data according to well known processing techniques to shift high-frequency components (such as components above 20 KHz) downward by about 10 KHz into the audible range (step 104 of FIG. 2). These frequency-shifted sensor signals may then be stored as digital audio data in association with the non-shifted sensor data, or the frequency-shifted sensor signals may be provided to an audio output device through which a test operator may listen to them. Preferably, the frequency-shift module 36 comprises software instructions executed by the processor 18 to perform the frequency-shifting operation. Alternatively, the frequency-shift module 36 comprises digital hardware, such as a programmable matrix array.

The frequency-shift module 36 may also be used to digitally downshift ultrasonic signals, such as signals detected by an ultrasonic sensor 12b. Thus, when reference is made herein to frequency-shifting functions, it will be understood that these functions apply to vibration signal components that are beyond human-audible range as well as to ultrasonic emissions. It will also be appreciated that the frequency-shift module 36 may be used to shift very low frequency vibration signal components up into the audible range.

With continued reference to FIG. 1, the frequency-shifted audio sensor data may be further processed in an audio processing module 38 before the audio data is stored or provided to an audio output device. In a preferred embodiment, the audio processing module 38 provides a "time-expansion" function to enhance the audibility of repetitive components of the audio signal. For example, a signal that required "X" seconds to record may be played back in "N times X" seconds, where N is some integer such as 4 or 8. In effect, this time-expansion function "slows down" the audio signal so that a test operator or data analyst can more clearly hear and distinguish repetitive patterns, such as would be generated by a bad bearing or defective gears. This function is particularly useful in monitoring the operation of intermediate to high-speed machines, such as those operating at 600 RPM and higher.

The audio processing module 38 may also provide an "equalizer" function to allow a test operator or data analyst to amplify selected frequency components in relation to other components so that the selected components can be more clearly heard.

A preferred embodiment of the apparatus 10 includes a digital storage device 20 for storing the digital sensor data (step 106 in FIG. 2). For example, the storage device 20 may comprise a magnetic hard disk drive, a flash memory drive or other data storage mechanism. The storage device 20 may also store setup information used in setting up the apparatus 10 for making measurements at particular measurement points along a measurement route. Such setup information may include settings for signal gain, signal offset and display scale, which values may vary from machine to machine along a measurement route. As discussed in more detail below, the storage device 20 also stores audio files containing sound information related to the sensor data, such as vibration or ultrasonic data that has been down-shifted into the audio range and/or time-expanded audio data (step 108 in FIG. 2). A digital data input/output port 22, such as a USB, IEEE 1394 or RS232 interface, is also provided for uploading and downloading data to and from the storage device 20 of the apparatus 10.

As shown in FIG. 1, the apparatus 10 includes a sound sensor 14 for receiving sound and generating analog audio signals based thereon (step 104 in FIG. 2). As used herein, "sound" refers to variations in air pressure within a frequency range which is generally detectable by the human ear. The sound sensor 14 may be integrated into a housing that contains the apparatus 10, or the sound sensor 14 may be in a separate housing and may be electrically connected to the housing of the apparatus 10 via an audio sensor cable. In some embodiments, the sound sensor 14 is wireless, and communicates with other components of the apparatus 10 via a wireless communication link 28, such as a Bluetooth link.

In some preferred embodiments, the sound sensor 14 comprises a microphone, such as an electret or bone-conduction microphone having noise-canceling capability. Such microphones are well known in the field of voice communications and are used extensively by firefighters, aircraft pilots and others working in high-noise environments. In some applications discussed herein, the sound sensor 14 comprises a directional microphone which an operator may use to detect sound from a desired direction while attenuating sound from undesired directions.

The analog audio signals generated by the sound sensor 14 are provided to signal conditioning circuitry 15c, which may include signal filter, noise canceling, offset and gain stages, as are well known to those skilled in the art. The conditioned analog audio signal at the output of the signal conditioning circuitry 15c is provided to an analog-to-digital converter 16c which converts the analog audio signal to digital audio data. In preferred embodiments, the digital audio data is then stored in the digital storage device 20 in association with the sensor data (step 108 in FIG. 2).

As shown in FIG. 1, a preferred embodiment of the invention includes a digital-to-analog conversion circuit 24 for converting digital audio data into analog audio output signals (step 112 in FIG. 2). These analog audio output signals are provided to an audio output device 26 that generates sound signals which may be perceived by the human ear (step 114 in FIG. 2). In one preferred embodiment, the audio output device 26 comprises an audio amplifier circuit and an audio reproduction device, such as audio headphones or an audio speaker. Some preferred embodiments include a wireless link 30, such as a Bluetooth link, for providing the audio data to the D/A 24 and the audio output device 26. In one embodiment, the sound sensor 14 and audio output device 26 are combined in a wireless headset, and the wireless links 28 and 30 are combined in a single two-way wireless communication link.

The portable machine data collection apparatus 10 preferably includes an input device 32 for receiving input from a user of the apparatus. The input device 32 may comprise a keypad, a touchpad, a touch screen or other known devices for allowing a user to input information and make operational selections. A display device 34 is also provided, such as an LCD or plasma screen, for displaying sensor data and operational information to the user. As indicated above, the display device 34 may be combined with the input device 32 in the form of a touch screen.

According to preferred embodiments of the invention, the sound sensor 14 is used to capture audio signals (step 104) that are associated with the operation of an industrial machine. These audio signals are preferably captured simultaneously with the capture of sensor data using the sensor 12a or the sensor 12b (step 102). For example, the sensor 12a may be a vibration sensor attached to a machine to measure vibration characteristics and to sense machine faults that are manifested in the vibration data. Simultaneously with the measurement of the vibration data, the sound sensor 14 captures sound information associated with the operational characteristics of the machine. The sound information and the vibration information are converted into one or more digital data files and are stored in association with each other on the digital storage device 20 (steps 106 and 108). In one exemplary embodiment, the audio data and sensor data are stored in association with information that identifies a particular machine and/or a particular measurement point along a measurement route.

In some applications, the apparatus 10 may be used to record voice annotations in association with sensor data. For example, using a sound sensor 14 in the form of a noise-canceling microphone, a test operator may record vocal comments regarding the subject matter of a particular sensor measurement (step 104), such as comments regarding the condition of the machine-under-test at the time of the measurement, the location of the sensor on the machine or any other information that later may be useful to a data analyst. These voice annotations are preferably stored as digital audio data in a data file on the storage device 20 (step 108), where the data file also includes the collected sensor data, or the data file is identified as being associated with a data file containing the collected sensor data. A noise-canceling microphone is particularly effective in this application to cancel out unwanted noise from the machine under test and background noise from the industrial environment.

In some preferred embodiments, verbal instructions or reminders regarding sensor measurements are prerecorded as one or more digital audio files on the storage device 20 of the apparatus 10 (steps 104 and 108). These digital audio files are preferably identified as being associated with a particular route point setup file stored on the apparatus 10. In this way, there may be different verbal instructions or reminders related to different measurement points along a route. When a test operator selects or activates a particular route point setup file on the apparatus 10, the associated digital audio file is accessed and the recorded instructions or reminders are played for the operator via the audio output 26.

In some preferred embodiments, an audio library of samples of sounds associated with particular kinds of fault conditions may be stored as digital audio files in the storage device 20 (steps 104 and 108). Using this feature, when a test operator encounters a machine making an unusual sound, the operator may listen to the samples of known fault sounds stored on the apparatus 10 to compare to the sound made by the machine (steps 112 and 114). In this way, the operator can identify the likely fault condition and deduce the most appropriate tests to perform or other actions to take. For example, using the input device 32, the operator may retrieve a list of known fault conditions for particular machines for which sample sounds have been recorded. This list may be displayed on the display device 34 of the apparatus 10. Using the input device 32, the operator may select sounds from the list to be played over the audio output device 26. Once the operator has identified a sound that most closely matches the sound being generated by the machine under test, the operator may use the input device 32 to select an associated stored test setup routine for initializing the apparatus 10 to collect data for analyzing the fault. In this embodiment, test setup routines for collecting diagnostic data are stored on the storage device 20 in association with digital audio files containing sounds related to the particular fault conditions to be diagnosed.

In situations where the measurement sensor 12b is an infrared camera, digital infrared image data from the sensor 12b may be stored on the digital storage device 20 in association with a standard photographic digital image that was captured at or about the same time as the infrared image. For example, the photographic digital image may be uploaded from a digital camera to the storage device 20 via the data I/O port 22. In this way, photographic image data and voice annotation data may be stored in association with the infrared image data, thereby providing information to a data analyst in a variety of formats for use in the analysis process.

The foregoing description of preferred embodiments for this invention have been presented for purposes of illustration and description. They are not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A portable apparatus for acquiring information indicative of the operational status of machines distributed at various locations along a measurement route, the apparatus comprising:
   one or more measurement sensors for measuring one or more characteristics of a machine at a location on the measurement route, where the one or more characteristics are indicative of the operational status of the machine, the one or more measurement sensors for generating one or more analog sensor signals based on the one or more sensed characteristics, the one or more analog sensor signals including frequency components that are beyond a human-audible frequency range;
   a sound sensor for generating an analog audio signal associated with the one or more characteristics of the machine measured by the one or more measurement sensors, where the analog audio signal is generated at one or more frequencies that are within the human-audible frequency range;
   one or more analog-to-digital conversion circuits for converting the one or more analog sensor signals to digital sensor data that is associated with the location along the measurement route, and for converting the analog audio signal to digital audio data that is associated with the location along the measurement route; and
   a digital storage device for storing the digital sensor data and the digital audio data.

2. The apparatus of claim 1 wherein the one or more measurement sensors comprise one or more devices selected from the group consisting of an accelerometer, a velocity transducer and an ultrasonic sensor.

3. The apparatus of claim 1 wherein the sound sensor comprises a noise-canceling microphone.

4. The apparatus of claim 1 further comprising a data output port for downloading the digital sensor data and the digital audio data to a central computer for performing data analysis.

5. The apparatus of claim 1 wherein the analog audio signal comprises a voice annotation containing vocal information regarding the sensor measurement.

6. The apparatus of claim 1 wherein the analog audio signal comprises voice instructions for instructing a test operator regarding procedures for conducting a measurement of a characteristic of the machine.

7. The apparatus of claim 1 wherein the analog audio signal comprises one or more samples of sounds associated with particular kinds of machine fault conditions.

8. The apparatus of claim 1 further comprising a digital-to-analog conversion circuit for converting the digital audio data into an analog audio output signal, and an audio output port to which an audio output device may be connected for listening to the analog audio output signal.

9. A portable apparatus for acquiring information indicative of the operational status of a machine in an industrial environment, the portable apparatus comprising:
- a measurement sensor for measuring a characteristic of the machine that is indicative of the operational status of the machine, the measurement sensor for generating an analog sensor signal based on the sensed characteristic, the analog sensor signal including inaudible frequency components that are beyond a human-audible frequency range;
- an analog-to-digital conversion circuit for converting the analog sensor signal to digital sensor data;
- a processor for receiving the digital sensor data and processing the digital sensor data to shift the inaudible frequency components into the human-audible frequency range, thereby generating digital audio data comprising at least the shifted frequency components; and
- a digital storage device for storing the digital audio data in association with the digital sensor data.

10. The apparatus of claim 9 wherein the inaudible frequency components comprise frequency components that are above the human-audible frequency range and the processor processes the digital sensor data to shift the inaudible frequency components downward into the human-audible frequency range, thereby generating the digital audio data comprising at least the down-shifted frequency components.

11. The apparatus of claim 9 wherein the inaudible frequency components comprise frequency components that are below the human-audible frequency range and the processor processes the digital sensor data to shift the inaudible frequency components upward into the human-audible frequency range, thereby generating the digital audio data comprising at least the up-shifted frequency components.

12. A method for acquiring information indicative of the operational status of machines distributed at various locations along a measurement route using a portable route-based measurement apparatus, the method comprising:
- (a) sensing a characteristic of a machine at a location on the measurement route, where the characteristic is indicative of the operational status of the machine;
- (b) generating a sensor signal based on the sensed characteristic, the sensor signal including one or more inaudible frequency components that are beyond a human-audible frequency range;
- (c) generating an audio signal associated with the characteristic of the machine sensed in step (a), where the audio signal includes one or more audible frequency components that are within the human-audible frequency range;
- (d) storing the sensor signal on the portable route-based measurement apparatus as digital sensor data that is associated with the location along the measurement route; and
- (e) storing the audio signal on the portable route-based measurement apparatus as digital audio data that is associated with the location along the measurement route.

13. The method of claim 12 wherein steps (a) and (b) are performed using a device selected from the group consisting of an accelerometer, a velocity transducer, an infrared sensor and an ultrasonic sensor.

14. The method of claim 12 further comprising:
- (f) downloading the digital sensor data and the digital audio data to a central computer for performing data analysis.

15. The method of claim 12 wherein the inaudible frequency components of the sensor signal comprise components that are above the human-audible frequency range, and step (c) comprises shifting the inaudible frequency components of the sensor signal downward into the human-audible frequency range.

16. The method of claim 15 wherein steps (a) and (b) are performed using an ultrasonic sensor.

17. The method of claim 15 wherein steps (a) and (b) are performed using an accelerometer.

18. The method of claim 12 wherein the inaudible frequency components of the sensor signal comprise components that are below the human-audible frequency range, and step (c) comprises shifting the inaudible frequency components of the sensor signal upward into the human-audible frequency range.

19. The method of claim 12 wherein step (c) comprises time-expanding the audio signal to enhance audibility of high-speed repetitive patterns in the audio signal.

20. The method of claim 12 wherein step (c) comprises generating a voice annotation containing information about the sensed characteristic.

21. The method of claim 12 wherein step (c) comprises generating one or more samples of sounds associated with particular kinds of machine fault conditions.

22. The method of claim 12 wherein step (c) comprises generating voice instructions for instructing a test operator regarding procedures for conducting a measurement of a characteristic of the machine.

23. The method of claim 12 further comprising:
- (f) converting the digital audio signal into an analog audio output signal; and
- (g) providing the analog audio output signal to an audio output device on the portable route-based measurement apparatus.

24. A method for storing information indicative of the operational status of one or more machines using a portable machine data measurement apparatus, the method comprising:
- (a) storing digital audio data files on the portable machine data measurement apparatus, where the digital audio data files contain audio data that is representative of audio sounds produced by one or more machines experiencing one or more fault conditions;
- (b) displaying a list of fault conditions in human-readable format on the portable machine data measurement apparatus;
- (c) receiving first selection input from an input device associated with the portable machine data measurement apparatus, the first selection input indicative of a selection of one of the fault conditions from the list;
- (d) accessing at least one of the digital audio files associated with the selection of one of the fault conditions from the list;
- (e) generating sound based on the accessed digital audio file, wherein the sound is generated by an audio device associated with the portable machine data measurement apparatus, and wherein the sound is representative of a sound produced by a machine experiencing a particular fault condition;
- (f) receiving second selection input from the input device, the second selection input indicative of a selection of a test setup file for setting up the portable machine data measurement apparatus to collect data for diagnosing the particular fault condition indicated by the sound generated in step (e);

(g) sensing one or more characteristics of a machine using the portable machine data measurement apparatus set up according to the test setup file selected in step (f);

(h) generating one or more sensor signals based on the one or more sensed characteristics; and (i) storing the one or more sensor signals on the portable machine data measurement apparatus as digital sensor data.

\* \* \* \* \*